US009909921B2

(12) United States Patent
Ichikawa et al.

(10) Patent No.: US 9,909,921 B2
(45) Date of Patent: Mar. 6, 2018

(54) TWO-DIMENSIONAL PHOTON COUNTING ELEMENT

(71) Applicant: HAMAMATSU PHOTONICS K.K., Hamamatsu-shi, Shizuoka (JP)

(72) Inventors: Minoru Ichikawa, Hamamatsu (JP); Kazuki Fujita, Hamamatsu (JP); Harumichi Mori, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/101,087

(22) PCT Filed: Nov. 18, 2014

(86) PCT No.: PCT/JP2014/080484
§ 371 (c)(1),
(2) Date: Jun. 2, 2016

(87) PCT Pub. No.: WO2015/087663
PCT Pub. Date: Jun. 18, 2015

(65) Prior Publication Data
US 2016/0305818 A1    Oct. 20, 2016

(30) Foreign Application Priority Data

Dec. 9, 2013   (JP) ................................. 2013-254261

(51) Int. Cl.
*G01J 1/42*   (2006.01)
*G01T 1/16*   (2006.01)
(Continued)

(52) U.S. Cl.
CPC .............. *G01J 1/4228* (2013.01); *G01T 1/16* (2013.01); *G01T 1/2928* (2013.01); *H04N 5/32* (2013.01);
(Continued)

(58) Field of Classification Search
CPC .................................. G01J 1/4228; G01T 1/16
(Continued)

(56) References Cited

U.S. PATENT DOCUMENTS 6,242,745 B1 * 6/2001 Berlad ................... G01T 1/1642
250/370.01
7,145,985 B2 * 12/2006 Strommer ............. A61B 6/4233
250/370.09
(Continued)

FOREIGN PATENT DOCUMENTS

JP     2013-501226 A       1/2013
WO    WO 2011/015235      2/2011
(Continued)

OTHER PUBLICATIONS

Abdalla, S. et al., "Circuit Implemention of Mechanism for Charge-Sharing Suppression for Photon-Counting Pixel Arrays", Norchip Conference, 2005. 23rd Oulu, Finland Nov. 21-22, 2005 Piscataway, NY, USA, IEEE, ISBN: 978-1-4244-0064-5, Nov. 21, 2005, p. 1-p. 4, XP010895290.
(Continued)

*Primary Examiner* — Seung C Sohn
(74) *Attorney, Agent, or Firm* — Drinker Biddle & Reath LLP

(57) ABSTRACT

An adding unit adds an input signal generated in a signal generating unit connected to a specific pixel electrode portion out of pixel electrode portions arranged around a certain pixel electrode portion to an input signal generated in a signal generating unit connected to the certain pixel electrode portion. A discriminating unit discriminates whether a carrier input pattern coincides with any one of a plurality of discrimination patterns, and the carrier input pattern indicates, per the pixel electrode portion, presence of any carrier received in the certain pixel electrode portion and the pixel electrode portions arranged around the certain pixel elec-
(Continued)

trode portion. The counting unit increments the number of photons in the case where the discriminating unit discriminates that the carrier input pattern coincides with any one of the discrimination patterns and further the input signal output from the adding unit after addition has a value exceeding a predetermined threshold.

5 Claims, 12 Drawing Sheets

(51) Int. Cl.
 *H04N 5/32* (2006.01)
 *G01T 1/29* (2006.01)
 *H04N 5/347* (2011.01)
 *H04N 5/3745* (2011.01)

(52) U.S. Cl.
 CPC ......... *H04N 5/347* (2013.01); *H04N 5/37455* (2013.01)

(58) Field of Classification Search
 USPC .............. 250/208.1, 370.09, 370.1; 378/98.8
 See application file for complete search history.

(56) References Cited

U.S. PATENT DOCUMENTS

| | | |
|---|---|---|
| 7,667,205 B2 | 2/2010 | Ballabriga et al. |
| 2014/0183371 A1* | 7/2014 | Roessl .................... G01T 1/241 250/370.09 |
| 2015/0234058 A1* | 8/2015 | Engel ..................... G01T 1/241 250/370.08 |

FOREIGN PATENT DOCUMENTS

| | | |
|---|---|---|
| WO | WO-2013/005848 A1 | 1/2013 |
| WO | WO-2013/048436 A1 | 4/2013 |

OTHER PUBLICATIONS

Suliman Abdalla et al., "Circuit Implementation of Mechanism for Charge-Sharing Suppression for Photon-Counting Pixel Arrays," IEEE Conference Publications NORCHIP Conference, Nov. 21, 2005 23rd, 137-140.

International Preliminary Report on Patentability dated Jun. 23, 2016 for PCT/JP2014/080484.

* cited by examiner

Fig.2
(a)
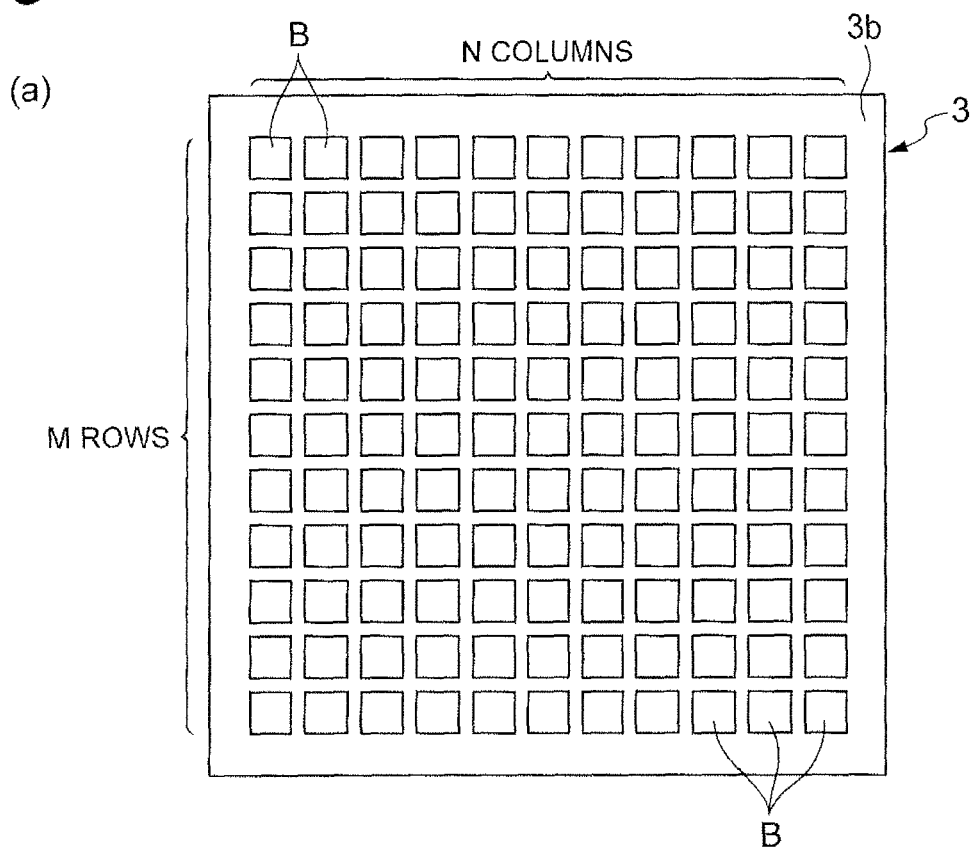
(b)
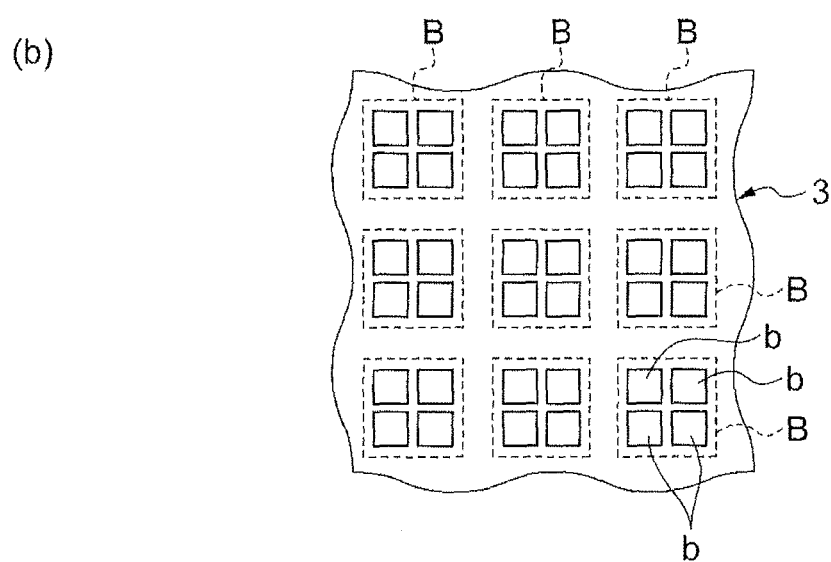

Fig.4
(a)
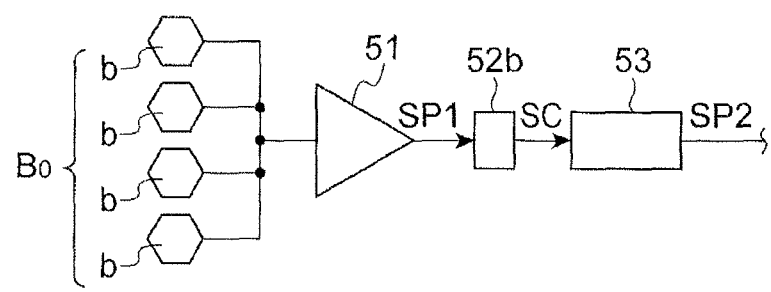
(b)
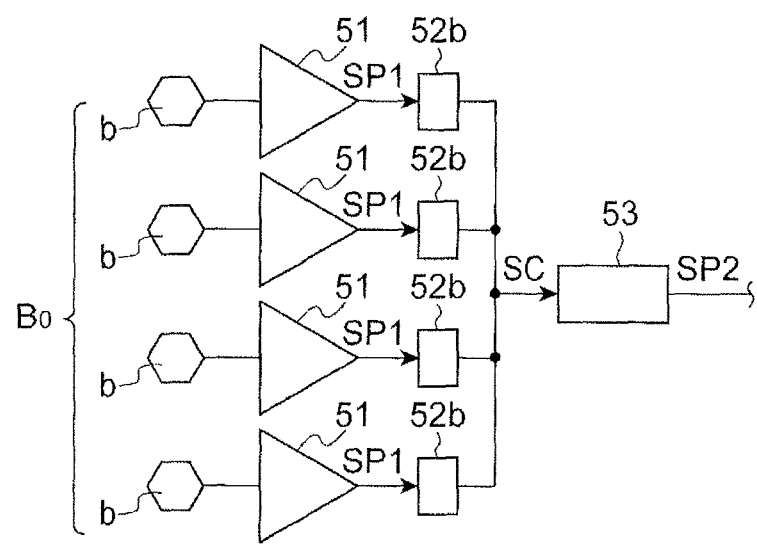

TWO-DIMENSIONAL PHOTON COUNTING ELEMENT

TECHNICAL FIELD

The present invention relates to a two-dimensional photon counting element.

BACKGROUND ART

In Patent Literature 1, disclosed is a signal processing method when a photon such as X-ray is incident to a sensor including a plurality of sensing areas. Patent Literature 1 recites a phenomenon in which electric charge generated in a sensor by the photon incidence does not stay only within one pixel and spreads in a plurality of pixels (charge share). According to the method disclosed in Patent Literature 1, a pixel (center pixel) having a charge amount exceeding a threshold is first detected from among the plurality of pixels in order to specify an incident position and intensity of the photon even in the event of the charge share. Further, a plurality of combination patterns is considered as combinations of the center pixel and peripheral pixels. The charge amounts in the pixels included in each of the combination patterns are added and the largest added value is output as a charge amount in the center pixel.

CITATION LIST

Patent Literature

Patent Literature 1: U.S. Pat. No. 7,667,205

SUMMARY OF INVENTION

Technical Problem

A two-dimensional photon counting element is an element that captures a weak radiological image or an optical image by: two-dimensionally detecting an incident position and intensity of a photon; and integrating the number of incidence in each position. The two-dimensional photon counting element includes: a plate-shaped or layered converting unit that converts a photon to a carrier such as charge; and a counting circuit that receives carriers from a plurality of pixel electrode portions connected to the converting unit, detects the carriers, and counts the number of photons.

In this kind of two-dimensional photon counting element, it is ideal that a plurality of carriers generated by the photon incidence into the converting unit is collected in one certain pixel electrode portion. A signal generating unit connected to the certain pixel electrode portion generates an input signal corresponding to the number of collected carriers. In a case where the generated input signal has a value exceeding a predetermined threshold, the counting circuit increments a count value in a corresponding pixel by one.

The plurality of carriers having been generated by the photon incidence may be dispersedly collected in a plurality of pixel electrode portions due to various kinds of phenomena such as thermal diffusion and repulsion between the carriers. In this case, there may be a problem that energy of the photon is undervalued or the count values in the plurality of pixels are incremented relative to incidence of one photon (hereinafter referred to as double count). In the method disclosed in Patent Literature 1, it seems necessary to adjust a threshold to be reference at the time of determining the center pixel. However, setting an appropriate threshold is not so easy. Further, in order to prevent double count, separate processing is required for the input signal and the input signal processing may become extremely complex. For example, in a case where photons each having a certain amount of energy are shared fifty-fifty percent by two pixels adjacent to each other, both incident positions are deemed as incident centers (impact centers) and double count may occur. In order to prevent such a phenomenon, separate processing is required for the input signal.

An embodiment of the present invention is directed to providing a two-dimensional photon counting element that can suppress occurrence of double count and reduce counting loss, and further can easily specify an incident position of a photon even in a case where the carriers are dispersedly collected in the plurality of pixel electrode portions.

Solution to Problem

One aspect of the present invention is a two-dimensional photon counting element that includes a counting circuit connected to a plurality of pixel electrode portions arrayed two-dimensionally in M rows and N columns (M and N are integers of two or more) and counting the number of photons by detecting carriers collected via the plurality of pixel electrode portions from a converting unit that converts a photon to the carrier. The counting circuit includes: a signal generating unit that generates an input signal having a value corresponding to the number of carriers received in a certain pixel electrode portion (hereinafter referred to as a subject electrode portion) out of the plurality of pixel electrode portions; an adding unit that adds the input signal generated in the signal generating unit connected to a specific pixel electrode portion (hereinafter referred to as specific electrode portion) out of the pixel electrode portions arranged around the subject electrode portion (hereinafter referred to as peripheral electrode portions) to the input signal generated in the signal generating unit connected to the subject electrode portion; a carrier input pattern discriminating unit that discriminates whether a carrier input pattern coincides with any one of a plurality of discrimination patterns, in which the carrier input pattern indicating, per pixel electrode portion, presence of any carrier received in the subject electrode portion and the peripheral electrode portions; and a counting unit that increments the number of photons in a case where the carrier input pattern discriminating unit discriminates that the carrier input pattern coincides with any one of the plurality of discrimination patterns and further the input signal output from the adding unit after addition has a value exceeding a predetermined threshold.

According to the present aspect, the carrier input pattern discriminating unit discriminates whether the carrier input pattern relative to a predetermined pixel electrode group coincides with any one of the plurality of discrimination patterns. The predetermined pixel electrode group is a group formed of the subject electrode portion connected to the carrier input pattern discriminating unit and all or a part of the peripheral electrode portions arranged around the subject electrode portion. In an example, the peripheral electrode portions represent eight pixel electrode portions or a part of those (for example, seven pixel electrode portions) included in at least any column or row out of a previous column and a following column of the column including the subject electrode portion and a previous row and a following row of the row including the subject electrode portion. The carrier input pattern indicates presence of any carrier received in any pixel electrode portion included in the pixel electrode group.

According to the above-described two-dimensional photon counting element, it can be determined whether there has been photon incidence in an area of the converting unit corresponding to each of the pixel electrode portions only by discriminating whether the carrier input pattern coincides with the plurality of discrimination patterns. Therefore, even in the case where carriers are dispersedly collected in the plurality of pixel electrode portions, occurrence of double count can be suppressed and also counting loss can be reduced. Further, an incident position of a photon can be extremely easily specified.

In the above-described two-dimensional photon counting element, the input signal having the value corresponding to the number of carriers is generated in the signal generating unit. Further, the input signal output from the signal generating unit connected to the subject electrode portion and the specific electrode portion out of the pixel electrode group is added by the adding unit. The specific electrode portion is the peripheral electrode portion deemed to be included in a dispersion range of the carriers resulting from the photons at the time of counting the number of photons, and further optionally and preliminarily determined from among the peripheral electrode portions. In the case where the input signal output from the adding unit alter addition has the value exceeding the predetermined threshold, it is deemed that one or more photons to be measured has been incident to the dispersion range. Therefore, the counting unit increments the number of photons in the case where the carrier input pattern is discriminated to coincide with any one of the plurality of discrimination patterns and further the input signal output from the adding unit after addition has the value exceeding the predetermined threshold. With this configuration, even in the case where the carriers are dispersedly collected in the plurality of pixel electrode portion, counting can be correctly performed in response to incidence of one or more photons to be measured.

According to the present aspect, the carrier input pattern in a case where the carrier is received in the pixel electrode portion other than the specific electrode portion out of the peripheral electrode portions may not necessarily coincide with any one of the plurality of discrimination patterns. In this case, pattern discrimination can be easily performed.

According to the present aspect, the plurality of discrimination patterns may include a pattern corresponding to a carrier input pattern in a case where the carrier is not received in the subject electrode portion. In this case, the carrier input pattern in the case where the carrier is not received in the subject electrode portion is incorporated in a part of the plurality of discrimination patterns. Therefore, counting loss can be further reduced, and the incident position of the photon can be more accurately specified.

According to the present aspect, the carrier input pattern in a case where the carrier is received in at least one specific electrode portion out of the specific electrode portions included in the row or the column including the subject electrode portion and further the carrier is received in the subject electrode portion may coincide with any one of the plurality of discrimination patterns.

According to the present aspect, the counting circuit may include, as the counting unit: a first counting unit that increments the number of photons in a case where the carrier input pattern is discriminated to coincide with any one of the plurality of discrimination patterns and further the input signal output from the adding unit after addition has a value exceeding a first threshold; and a second counting unit that increments the number of photons in a case where the carrier input pattern is discriminated to coincide with any one of the plurality of discrimination patterns and further the input signal output from the adding unit after addition has a value exceeding a second threshold larger than the first threshold.

According to the present aspect, the plurality of discrimination patterns may not include the carrier input pattern in a case where the carrier is received in the peripheral electrode portion included in one of the previous row and the following row of the row including the subject electrode portion and the peripheral electrode portion included in one of the previous column and the following column of the column including the subject electrode portion, and the peripheral electrode portion included neither one of the mentioned columns nor one of the mentioned rows may be a specific electrode. In this case, increment of the number of photons in the plurality of pixel circuits can be properly prevented relative to incidence of one photon.

According to the present aspect, the plurality of discrimination patterns may include the carrier input pattern in a case where: the carrier is received in the peripheral electrode portion not included in one of the mentioned columns and further included in the row including the subject electrode portion; the carrier is received in the peripheral electrode portion not included in one of the mentioned rows and further included in the column including the subject electrode portion; and further the carrier is not received in the subject electrode portion.

Advantageous Effects of Invention

According to the foregoing one aspect of the present invention, it is possible to provide a two-dimensional photon counting element that can suppress occurrence of double count and reduce counting loss and further can easily specify an incident position of a photon even in the case where the carriers are dispersedly collected in the plurality of pixel electrode portions.

BRIEF DESCRIPTION OF DRAWINGS

FIG. 2 is a plan view illustrating arrangement of a plurality of pixel electrode portions on a back surface of a converting unit.

FIG. 4 is a diagram illustrating examples of circuits in a case where each pixel electrode portion includes a plurality of electrodes.

DESCRIPTION OF EMBODIMENTS

In the following, embodiments of the present invention will be described in detail with reference to the accompanying drawings. Note that a same component or a component having the same function will be denoted by a same reference sign in the description, and repeated description therefor will be omitted.

Figure 1:
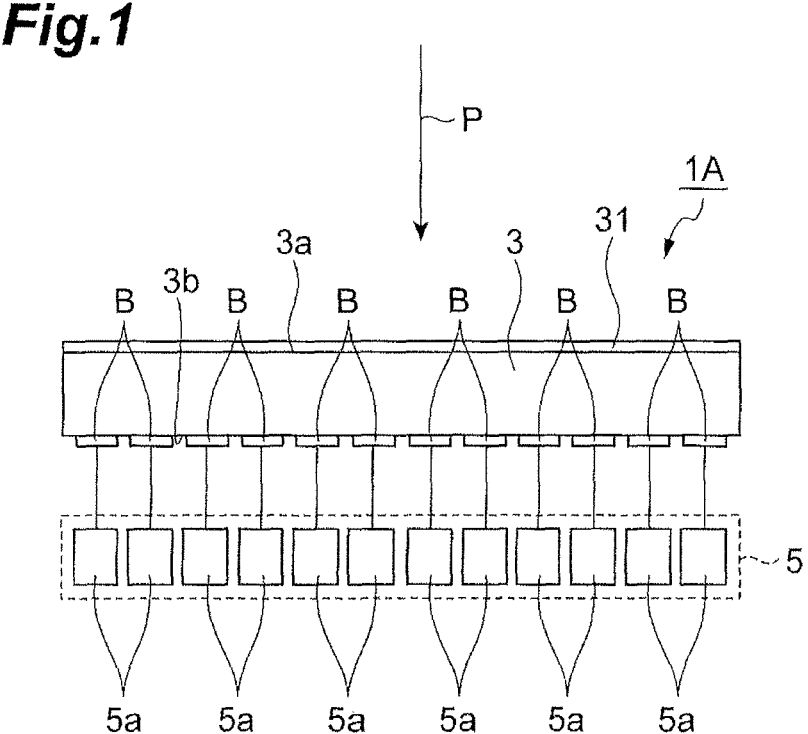
FIG. 1 is a diagram illustrating a configuration of a two-dimensional photon counting element according to an embodiment of the present invention.

FIG. 1 is a diagram illustrating a configuration of a two-dimensional photon counting element 1A according to an embodiment of the present invention. As illustrated in FIG. 1, the two-dimensional photon counting element 1A of the present embodiment includes a converting unit 3, a plurality of pixel electrode portions B, and a counting circuit 5.

The converting unit 3 is a bulky or layered member that absorbs a photon P such as light, X-ray, or the like, and generates a carrier. The converting unit 3 is formed of, for example, a material containing at least one of CdTe, CdZnTe, GaAs, InP, TlBr, $HgI_2$, $PbI_2$, Si, Ge, and a-Se. The converting unit 3 extends along a plane intersecting with an incident direction of the photon P, and includes a front surface 3a and a back surface 3b. A bias electrode (common electrode) 31 is provided on the front surface 3a to cover an entire surface of the front surface 3a. The photon P passes through the bias electrode 31 and is incident to the front surface 3a.

The plurality of pixel electrode portions B is provided on the back surface 3b of the converting unit 3. High voltage is applied between the plurality of pixel electrode portions B and the bias electrode 31 as bias voltage. In a diagram (a) of FIG. 2 is a plan view illustrating arrangement of the plurality of pixel electrode portions B on the back surface 3b of the converting unit 3. The plurality of pixel electrode portions B is two-dimensionally arrayed in M rows and N columns in the view from the incident direction of the photon P (M and N are integers of two or more). Each of the M×N pixel electrode portions B forms each of pixels areas having the M rows and the N columns in the converting unit 3. The respective pixel electrode portions B collect carriers generated in the corresponding pixel areas. In the diagram (a) illustrated in FIG. 2, each of the pixel electrode portions B is formed of one electrode. As illustrated in a diagram (b) of FIG. 2, for example, one pixel electrode portion B may also include a plurality of electrodes b.

The counting circuit 5 detects the carrier generated in the converting unit 3 per pixel area, and counts the number of photons per pixels area. The counting circuit 5 is implemented by an integrated circuit such as an application specific integrated circuit (ASIC). The counting circuit 5 includes a plurality of pixel circuits (M×N pixel circuits) 5a. Each of the pixel circuits 5a detects carriers collected in a corresponding pixel electrode portion B, and counts the number of photons.

Figure 3:
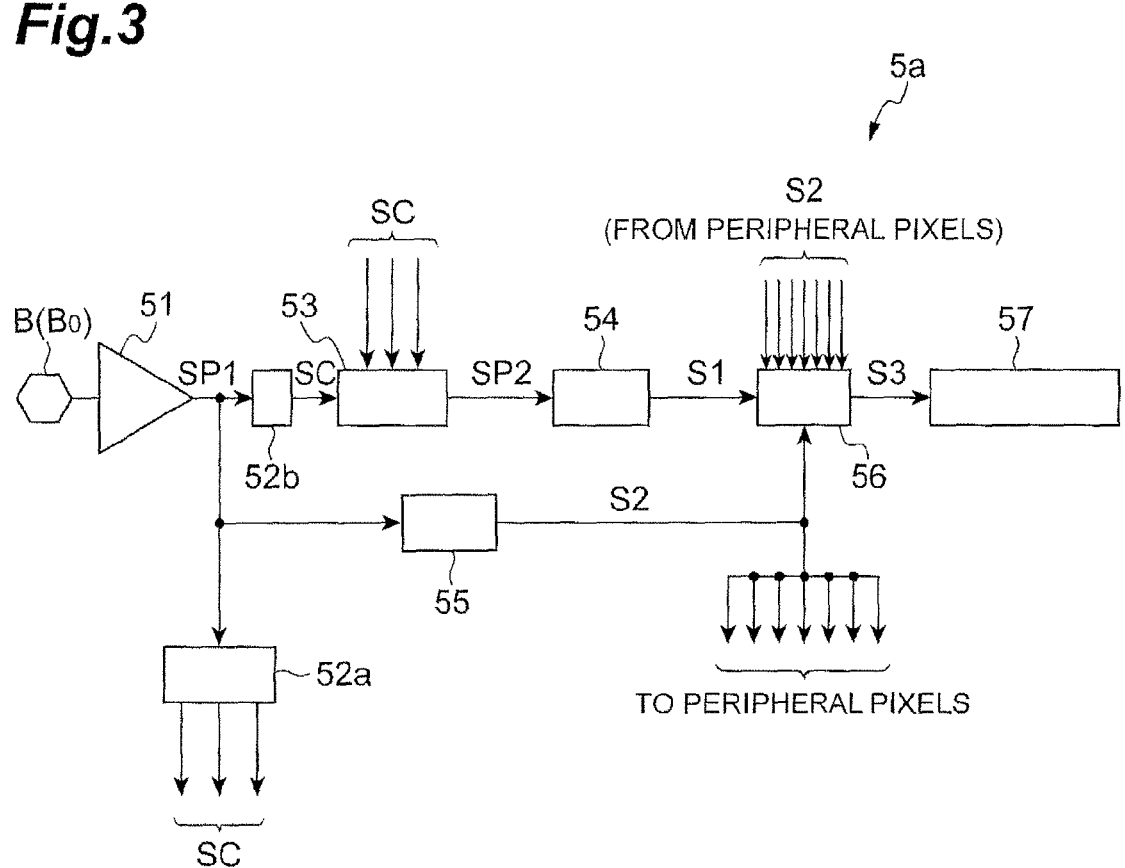
FIG. 3 is a diagram illustrating an example of internal configuration of each pixel circuit.

FIG. 3 is a diagram illustrating an example of internal configuration of each pixel circuit 5a. As illustrated in FIG. 3, the pixel circuit 5a includes a signal generating unit 51, current outputting units 52a, 52b, an adding unit 53, a comparing unit 54, a carrier input signal generating unit 55, a carrier input pattern discriminating unit 56, and a counting unit 57.

The signal generating unit 51 is electrically connected to a pixel electrode portion B connected to a concerning pixel circuit 5a out of the plurality of pixel electrode portions B. The signal generating unit 51 generates an input signal SP1 by converting a carrier from charge to voltage. In the following description, the pixel electrode portion B connected to the concerning pixel circuit 5a may be referred to as a subject electrode portion $B_0$. The input signal SP1 is a signal including a voltage waveform having a value corresponding to the number of carriers received in the pixel circuit 5a from the subject electrode portion $B_0$. In the case where each of the pixel electrode portions B includes a plurality of electrodes b (refer to the diagram (b) illustrated in FIG. 2), as illustrated in a diagram (a) of FIG. 4, the plurality of electrodes b may be connected to an input end of one signal generating unit 51. Alternatively, as illustrated in a diagram (b) of FIG. 4, a plurality of signal generating units 51 may be provided and the plurality of electrodes b may be respectively connected to the plurality of signal generating units 51.

The current outputting unit 52a is connected to an output end of the signal generating unit 51 and receives the input signal SP1 from the signal generating unit 51. The current outputting unit 52a generates a current signal SC having a value corresponding to the input signal SP1 that is a voltage signal, and supplies the current signal SC to the pixel circuit 5a connected to a specific pixel electrode portion B out of the pixel electrode portions B arranged around the subject electrode portion $B_0$. In the following description, the pixel electrode portions B arranged around the subject electrode portion $B_0$ may be referred to as peripheral electrode portions.

Figure 5:
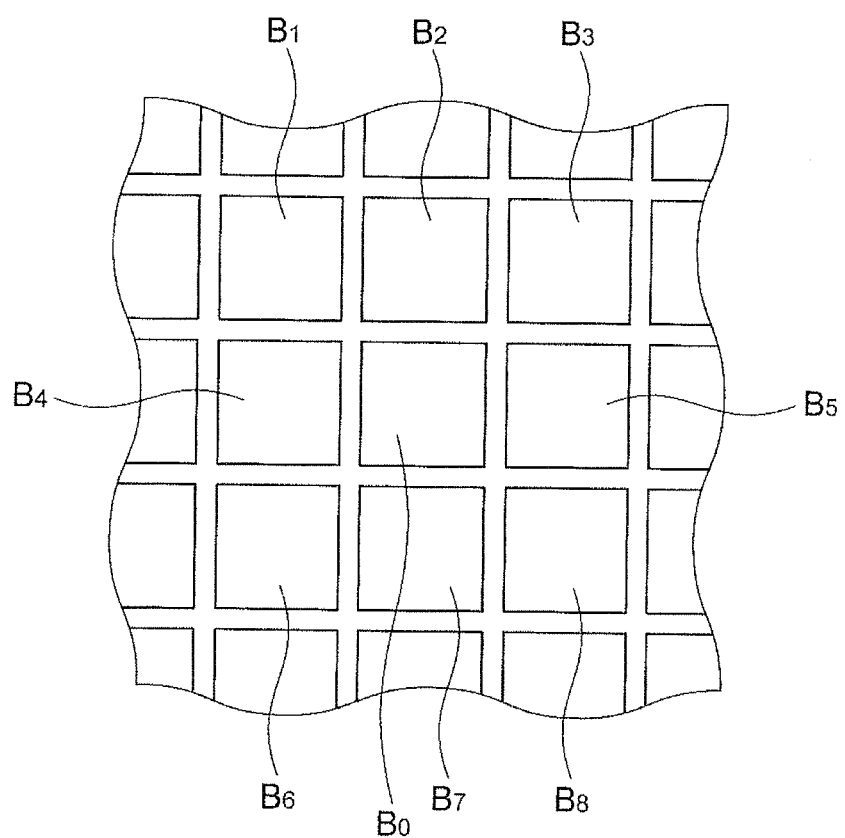
FIG. 5 is a diagram illustrating a subject electrode portion and eight peripheral electrode portions surrounding the subject electrode portion.

Now, reference is made to FIG. 5. FIG. 5 is a diagram illustrating the subject electrode portion $B_0$ and eight peripheral electrode portions $B_1$ to $B_8$ surrounding the subject electrode portion $B_0$. In the example illustrated in FIG. 5, the peripheral electrode portions $B_1$ to $B_3$ are included in a previous row of the subject electrode portion $B_0$, the peripheral electrode portions $B_4$, $B_5$ are included in the same row as the subject electrode portion. $B_0$, and the peripheral electrode portions $B_6$ to $B_8$ are included a following row of the subject electrode portion $B_0$. Further, the peripheral electrode portions $B_1$, $B_4$, $B_6$ are included in a previous column of the subject electrode portion $B_0$, the peripheral electrode portions $B_2$, $B_7$ are included in the same column as the subject electrode portion $B_0$, and the peripheral electrode portions $B_3$, $B_5$, $B_8$ are included in a following column of the subject electrode portion $B_0$. In the present embodiment, the current outputting unit 52a supplies the current signals SC to the pixel circuits 5a connected to the peripheral electrode portions $B_1$, $B_2$, $B_4$.

Again, reference is made to FIG. 3. The current outputting unit 52b is connected to an output end of the signal generating unit 51 and receives the input signal SP1 from the signal generating unit 51. The current outputting unit 52b generates the current signal SC having a value corresponding to the input signal SP1 that is a voltage signal, and supplies the current signal SC to the adding unit 53. The adding unit 53 is connected to the current outputting units 52a of the three pixel circuits 5a connected to the specific electrode portions (hereinafter referred to as specific electrodes portions) $B_5$, $B_7$, $B_8$ out of the peripheral electrode portions $B_1$ to $B_8$, and receives the current signals SC from the current outputting unit 52a thereof. The adding unit 53 adds the received three current signals SC to the current signal SC supplied from the current outputting unit 52b of the concerning pixel circuit 5a, and generates a voltage signal SP2 having a value corresponding to current obtained after addition. The voltage signal SP2 is a signal including a voltage wave having a value corresponding to a sum of the number of carriers received in the subject electrode portion $B_0$ and the specific electrode portions $B_5$, $B_7$, $B_8$. The specific electrode portions $B_5$, $B_7$, $B_8$ are the peripheral electrode portions deemed to be included in a dispersion range of the carriers resulting from the photons P at the time of counting the number of photons in each of the pixel circuits 5a, and are optionally and preliminarily determined from among the peripheral electrode portions $B_1$ to $B_8$. For example, in the case where some of the specific electrode portions $B_5$, $B_7$, $B_8$ relative to the subject electrode portion $B_0$ do not exist for the reason that the subject electrode portion $B_0$ is located at an end of the row or an end of the column, the adding unit 53 does not need to add a current signal SC from the specific electrode portion not existing. For example, in the case where all of the specific electrode portions $B_5$, $B_7$, $B_8$ relative to the subject electrode portion $B_0$ do not exist for the reason that the subject electrode portion $B_0$ is located at an end of the row end and also an end of the column end, the adding unit 53 and the subsequent circuit components thereafter are not needed and can be omitted.

The comparing unit 54 is connected to an output end of the adding unit 53, and receives the voltage signal SP2 from the adding unit 53. The comparing unit 54 determines whether a peak voltage value of the voltage signal SP2 exceeds a predetermined threshold. More specifically, the comparing unit 54 determines whether the number of carriers equivalent to one or more photons P to be measured is generated in the periphery of the subject electrode portion $B_0$. In the case where the peak voltage value of the voltage signal SP2 exceeds the predetermined threshold, the comparing unit 54 outputs a High level (significant value) as a determination result signal S1. In the case where the peak voltage value of the voltage signal SP2 does not exceed the predetermined threshold, the comparing unit 54 outputs a Low level (non-significant value) as the determination result signal S1.

The carrier input signal generating unit 55 is connected to an output end of the signal generating unit 51, and receives the input signal SP1 from the signal generating unit 51. In the case of receiving the input signal SP1 exceeding a certain threshold (for example, a value slightly higher than a noise level), the carrier input signal generating unit 55 outputs the High level (significant value) as a carrier input signal S2 in order to indicate that there is some carrier received in the subject electrode portion $B_0$. In the case of receiving the input signal SP1 not exceeding the certain threshold, the carrier input signal generating unit 55 outputs the Low level (non-significant value) as the carrier input signal S2. The carrier input signal S2 is supplied to each of the seven pixel circuits 5a connected to the peripheral electrode portions $B_2$ to $B_8$ respectively.

The carrier input pattern discriminating unit 56 receives the carrier input signals S2 from the seven pixel circuits 5a respectively connected to the peripheral electrode portions $B_1$ to $B_7$. The carrier input pattern discriminating unit 56 discriminates whether the carrier input pattern coincides with any one of the plurality of discrimination patterns based on these carrier input signals S2. The carrier input pattern indicates, per electrode, presence of a carrier receipt in the subject electrode portion $B_0$ and the peripheral electrode portions $B_1$ to $B_7$. In the carrier input pattern, in which pixel electrode portions B out of the subject electrode portion $B_0$ and the peripheral electrode portions $B_1$ to $B_8$ carrier(s) is (are) received is patterned. In the case where the carrier input pattern coincides with any one of the plurality of discrimination patterns and further the High level (significant value) is received as the determination result signal S1, the carrier input pattern discriminating unit 56 outputs the High level (significant value) as a discrimination signal S3. In the case where the carrier input pattern does not coincide with any one of the plurality of discrimination patterns and/or the Low level (non-significant value) is received as the determination result signal S1, the carrier input pattern discriminating unit 56 outputs the Low level (non-significant value) as the discrimination signal S3. Due to this, the counting unit 57 increments the number of photons in the case where the carrier input pattern discriminating unit 56 discriminates that the carrier input pattern coincides with any one of the plurality of discrimination patterns and further the peak voltage value of the voltage signal SP2 exceeds the predetermined threshold (namely, in the case where the discrimination signal S3 is the High level (significant value)). In the present embodiment, presence of the carrier incidence in the peripheral electrode portion $B_8$ does not affect discrimination. Therefore, the carrier input pattern discriminating unit 56 does not need to receive the carrier input signal S2 from the pixel circuit 5a connected to the peripheral electrode portion $B_8$. In the present embodiment, one counting unit 57 is provided per pixel electrode portions B, but only one counting unit 57 may also be provided per two or more pixel electrode portions B.

Figure 6:
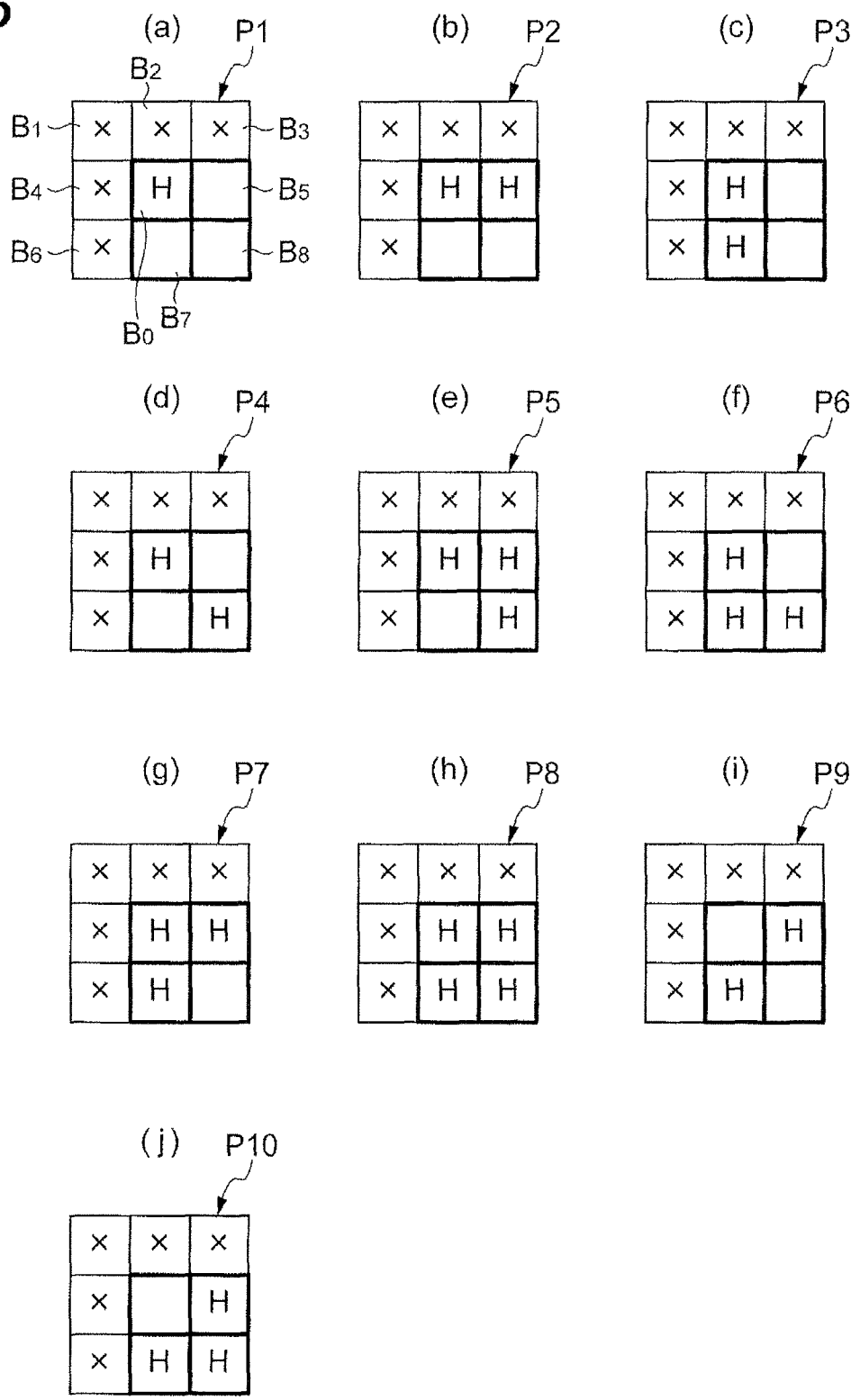
FIG. 6 is a diagram illustrating ten discrimination patterns as examples of a plurality of discrimination patterns set in a carrier input pattern discriminating unit.

Now, reference is made to FIG. 6. In FIG. 6, (a) to (j) are diagrams illustrating ten discrimination patterns P1 to P10 as examples of the plurality of discrimination patterns set in the carrier input pattern discriminating unit 56. In FIG. 6, a pixel electrode portion a corresponding to a pixel circuit 5a to which the carrier input signal S2 is output (namely, where carrier is received) is indicated as "H". The subject electrode portion $B_0$ and the specific electrode portions $B_5$, $B_7$, $B_8$ are indicated by thick frames to easily understand the discrimination patterns P1 to P10. The reference signs of the subject electrode portion $B_0$ and the peripheral electrode portions $B_1$ to $B_7$ are only indicated in the diagram (a) of FIG. 6, and omitted in the diagrams (b) to (j) of FIG. 6. The carrier input pattern discriminating unit 56 may be constituted a plurality of logic circuits combined to each other. In this case, the plurality of logic circuits combined to each other determine validity in accordance with combination between the carrier input signals S2 from the peripheral electrode portions $B_1$ to $B_7$ and the carrier input signal S2 of the subject electrode portion $B_0$. With this configuration, the carrier input pattern discriminating unit 56 discriminates whether the carrier input pattern coincides with any one of the plurality of discrimination patterns (e.g., discrimination patterns P1 to P10). Further, the counting circuit 5 may include a memory to store the plurality of discrimination patterns (e.g., discrimination patterns P1 to P10). In this case, the carrier input pattern discriminating unit 56 discriminates whether the carrier input pattern coincides with any one of the plurality of discrimination patterns stored in the memory. In the case where the carrier input pattern discriminating unit 56 is constituted the plurality of logic circuits combined to each other, a physical component such as the memory is not necessary, and the configuration of the counting circuit 5 can be simplified.

The ten discrimination patterns P1 to P10 illustrated in FIG. 6 are defined by some rules. The carrier input pattern in the case where carriers are received in the pixel electrode portions $B_1$ to $B_4$, $B_6$ other than the specific electrode portions $B_5$, $B_7$, $B_8$ out of the peripheral electrode portions $B_1$ to $B_8$ does not coincide with any one of the discrimination patterns P1 to P10. In other words, these discrimination patterns P1 to P10 do not include a pattern corresponding to the carrier input pattern in the case where the carrier is received in any one of the peripheral electrode portions $B_1$ to $B_3$ included in one of the previous row and the following row (previous row in the present embodiment) of the row including the subject electrode portion $B_0$ and peripheral electrode portions $B_1$, $B_4$, $B_6$ included in one of the previous column and the following column (previous column in the present embodiment) of the column including the subject electrode portion $B_0$. Therefore, in the case where the carrier is received in any one of the peripheral electrode portions $B_1$ to $B_4$, $B_6$, the carrier input pattern discriminating unit 56 of the pixel circuit 5a connected to the subject electrode portion $B_0$ discriminates that the carrier input pattern does not coincide with any one of the plurality of discrimination patterns P1 to P10. In the case where the carrier is received in any one of the peripheral electrode portions $B_1$ to $B_4$, $B_6$, the discrimination patterns P1 to P10 are set such that the carrier input pattern surely coincides with any one of the discrimination patterns P1 to P10 in the pixel circuit 5a connected to any one of the pixel electrode portions B other than the subject electrode portion $B_0$. Therefore, since the discrimination patterns P1 to P10 are set in accordance with the above-described discrimination rule, increment of the number of photons in the plurality of pixel circuits 5a can be prevented relative to incidence of one photon P. For easy understanding for the discrimination patterns P1 to P10, the peripheral electrode portions $B_1$ to $B_4$, $B_6$ are indicated by marks x. The "Low" carrier input signal S2 same as an empty pixel are actually output from the pixel circuits 5a connected to the peripheral electrode portion $B_1$ to $B_4$, $B_6$ indicated by the marks x. This discrimination rule is effective in the case where the peripheral electrode portions $B_5$, $B_7$, $B_8$ are specific electrodes included in neither one of the above-mentioned rows (previous row) nor one of the above-mentioned column (previous column) unlike the present embodiment.

These discrimination patterns P1 to P10 include patterns corresponding to all of the carrier input patterns in the case where: the carrier is received in at least one peripheral electrode portion out of the peripheral electrode portions $B_5$, $B_7$ included in neither one of the above-mentioned rows (previous row) nor one of the above-mentioned columns (previous column) and further included in the row or the column including the subject electrode portion $B_0$; and further the carrier is received in the subject electrode portion $B_0$. In other words, the carrier input pattern in the case where the carrier is received in at least one specific electrode portion out of the specific electrode portions $B_5$, $B_7$ included in the row or the column including the subject electrode portion $B_0$ and further the carrier is received in the subject electrode portion $B_0$ surely coincides with any one of the plurality of discrimination patterns P1 to P10. More specifically, all of the patterns in the case where the carriers are received in the peripheral electrode portion $B_5$ and the subject electrode portion $B_0$ are indicated by the discrimination patterns P2, P5, P7, P8. All of the patterns in the case where the carriers are received in the peripheral electrode portion $B_7$ and the subject electrode portion $B_0$ are indicated by the discrimination patterns P3, P6, P7, P8. Since the discrimination patterns are set in accordance with the above-described discrimination rule, whether to increment the number of photons in the concerning pixel circuit 5a can be properly determined.

These discrimination patterns P1 to P10 include patterns corresponding to the carrier input patterns in the case where: the carrier is received in the peripheral electrode portion $B_5$ not included in one of the above-mentioned columns (previous column) and further included in the row including the subject electrode portion $B_0$; the carrier is received in the peripheral electrode portion $B_7$ not included in one of the above-mentioned rows (previous row) and further included in the column including the subject electrode portion $B_0$; and further the carrier is not received in the subject electrode portion $B_0$. More specifically, all of the patterns in the case where the carriers are received in both of the peripheral electrode portions $B_5$, $B_7$ and the carrier is not received in the subject electrode portion $B_0$ are indicated by the discrimination patterns P9, P10. Since the discrimination patterns are set in accordance with the above-described discrimination rule, whether to increment the number of photons in the concerning pixel circuit 5a can be properly determined. The discrimination patterns P1 to P10 are substantially free from influence of charge share, and include the discrimination pattern P1 in the case where the carrier is received only in the subject electrode portion $B_0$.

Figure 7:
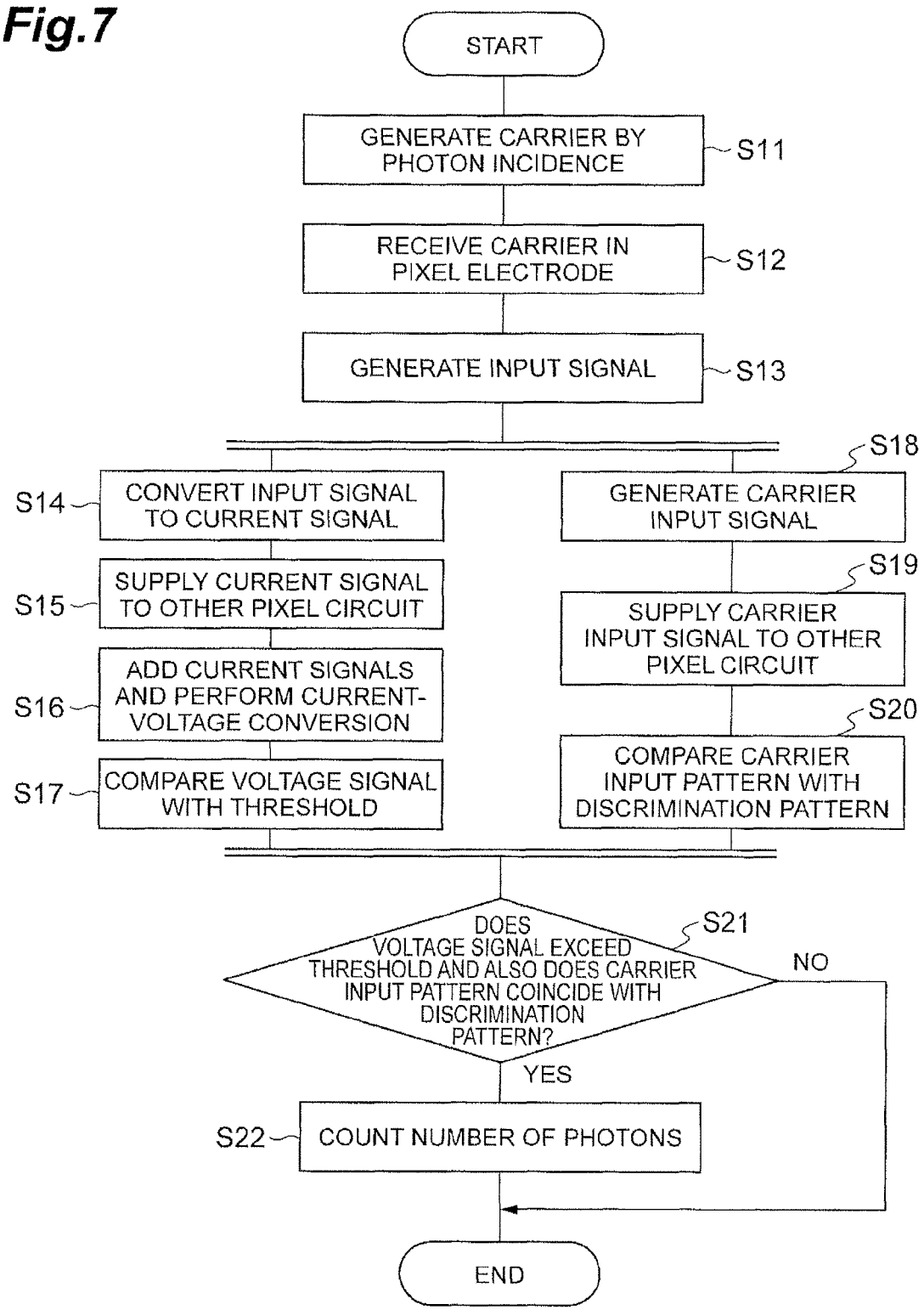
FIG. 7 is a flowchart illustrating operation of the two-dimensional photon counting element.

Operation of the two-dimensional photon counting element 1A having the above-described configuration will be described. FIG. 7 is a flowchart illustrating operation of the two-dimensional photon counting element 1A.

In the two-dimensional photon counting element 1A, a plurality of carriers is first generated in the converting unit 3 when photons P such as an optical image, an X-ray image, or the like are incident to the converting unit 3 (S11). The plurality of carriers moves inside the converting unit 3 and is received in one or more than one pixel electrode portion B out of the plurality of pixel electrode portions B (S12). The input signal SP1 is generated in the signal generating unit 51 in each of the pixel circuits 5a connected to the pixel electrode portions B having received the carriers (S13). Further, the input signal SP1 is converted to the current signal SC by the current outputting units 52a, 52b (S14). The current signal SC output from the current outputting unit 52a is supplied to each of the pixel circuits 5a connected to the peripheral electrode portions $B_1$, $B_2$, $B_4$ relative to the subject electrode portion $B_0$ corresponding to each of the pixel circuits 5a (S15). Further, the current signal SC output from the current outputting unit 52b is supplied to the adding unit 53.

Subsequently, the adding unit 53 receives the current signals SC from the current outputting units 52a of the three pixel circuits 5a connected to the specific electrode portions $B_5$, $B_7$, $B_8$. Further, the supplied three current signals SC and the current signal SC generated in the current outputting unit 51b of the concerning pixel circuit 5a are added, and the voltage signal SP2 is generated (S16). Subsequently, whether the peak voltage value of the voltage signal SP2 exceeds the predetermined threshold is determined in the comparing unit 54 (S17). In the case where the peak voltage value of the voltage signal SP2 exceeds the predetermined threshold, the determination result signal S1 becomes the High level (significant value).

In parallel to a series of the above-described operation S14 to S17, operation S18 is performed. In operation S18, in the case where the input signal SP1 exceeding a certain threshold is received, the carrier input signal S2 generated by the carrier input signal generating unit 55 becomes the High level (significant value) in order to indicate receipt of the carrier in the subject electrode portion $B_0$. The carrier input signal S2 is supplied to each of the seven pixel circuits 5a connected to the peripheral electrode portions $B_2$ to $B_8$ respectively (S19).

Subsequently, in the carrier input pattern discriminating unit 56, whether the carrier input pattern coincides with any one of the plurality of discrimination patterns is discriminated. The carrier input pattern indicates, per electrode, presence of any carrier received in the subject electrode portion $B_0$ and the peripheral electrode portions $B_1$ to $B_8$ (S20). Further, in the case where the carrier input pattern is discriminated to coincide in operation S20 and further the determination result signal S1 is the High level (significant value) ("YES" in S21), the discrimination signal S3 becomes the High level (significant value) and the number of photons is incremented in the counting unit 57 (S22).

Effects obtained by the two-dimensional photon counting element 1A according to the above-described present embodiment will be described. As described above, the plurality of carriers generated by incidence of the photons P in the converting unit 3 may be dispersedly collected in the plurality of pixel electrode portions. In the case where the dispersion range is relatively narrow (for example, in the case where the dispersion range is within pixels 2×2), dispersion of the carriers is caused by, for example, thermal diffusion and repulsion between the carriers. In the case of photoelectric conversion, all energy is converted to a photoelectron at an incident position of the photons P in the converting unit 3, but such high-energy photoelectron generates the carrier while moving inside the converting unit 3 and losing energy. In this case also, dispersion of the carriers may be caused.

In the two-dimensional photon counting element 1A of the present embodiment, the carrier input pattern discriminating unit 56 discriminates whether the carrier input pattern coincides with any one of the plurality of discrimination patterns P1 to P10 relative to a pixel electrode group formed of the subject electrode portion $B_0$ and the peripheral electrode portions $B_1$ to $B_8$. Further, the carrier input pattern discriminating unit 56 determines whether to output the output from the comparing unit 54 to the counting unit 57 based on the discrimination result. Thus, according to the two-dimensional photon counting element 1A of the present embodiment, whether to count the number of photons (in other words, whether to deem that any photon P has been incident to a pixel area corresponding to each of the pixel electrode portions B in the converting unit 3) can be determined only by discriminating whether the carrier input pattern coincides with the plurality of discrimination patterns P1 to P10. Therefore, in the two-dimensional photon counting element 1A, double count can be prevented and further counting loss is reduced even in the case where the carriers are dispersedly collected in the plurality of pixel electrode portions B (even in the event of charge share). As a result, the incident position of the photon P can be extremely easily specified by the two-dimensional photon counting element 1A without performing any complex processing.

As described above, according to the present embodiment, the input signal SP1 having the value corresponding to the number of carriers received in each of the pixel circuits 5a is generated and converted to the current signal SC, and then, the current signals SC of the pixel circuits 5a connected to the subject electrode portion $B_0$ and the specific electrode portions $B_5$, $B_7$, $B_8$ are added in the adding unit 53. Further, in the case where the value of the voltage signal SP2 output from the adding unit 53 after addition exceeds the predetermined threshold, in other words, in the case where one or more photons P to be measured are deemed to have been incident into the dispersion range, the determination result signal S1 received in the carrier input pattern discriminating unit 56 from the comparing unit 54 connected to the subject electrode portion $B_0$ becomes the High level (significant value). With this configuration, one or more photons P to be measured can be correctly counted even in the case where the carriers are dispersedly collected in the plurality of pixel electrode portions B.

Actually, there may be diffusion having a state different from the above-described carrier dispersion (diffusion). As the diffusion having the different state, a diffusion distance may be larger compared to the above-described carrier diffusion, but such the state rarely occurs. According to the present embodiment, targeted charge share is preliminarily determined, and a range of the peripheral electrode portions and the like is set based on estimated expansion of the targeted charge share. In other words, a phenomenon of having an extremely large diffusion range is not targeted for measurement. Therefore, correction processing can be simply performed without complex processing like Patent Literature 1 (for example, processing to sequentially increase addition areas).

In the present embodiment, the discrimination patterns P9, P10 that are the patterns corresponding to the carrier input pattern in the case where the carrier is not received in the subject electrode portion $B_0$ are included in the discrimination patterns P1 to P10. Generally, in the case where the carrier is not received in a certain pixel electrode portion B, the number of photons is not incremented in the pixel circuit 5a connected to the certain pixel electrode portion B. However, in the event of a phenomenon called. K-escape in the converting unit 3, for example, the carrier may not be received in a pixel electrode portion B corresponding to an incident position of a photon P. In the present embodiment, even in such a case, counting loss is further reduced since the carrier input pattern in the case where the carrier is not received in the subject electrode portion $B_0$ is incorporated in a part of the plurality of discrimination patterns P1 to P10. As a result, the incident position of the photon P can be more accurately specified by the two-dimensional photon counting element 1A. The K-escape is the phenomenon in which, for example, an L-shell photoelectron or an M-shell photoelectron falls into a position where a K-shell came off, and differential X-ray is emitted.

Subsequently, a modified example of the plurality of discrimination patterns will be described. In the above-described embodiment, the ten discrimination patterns P1 to P10 illustrated in FIG. 6 have been exemplified, but other different discrimination patterns are also applicable in the two-dimensional photon counting element 1A according to the present embodiment.

First Modified Example

Figure 8:
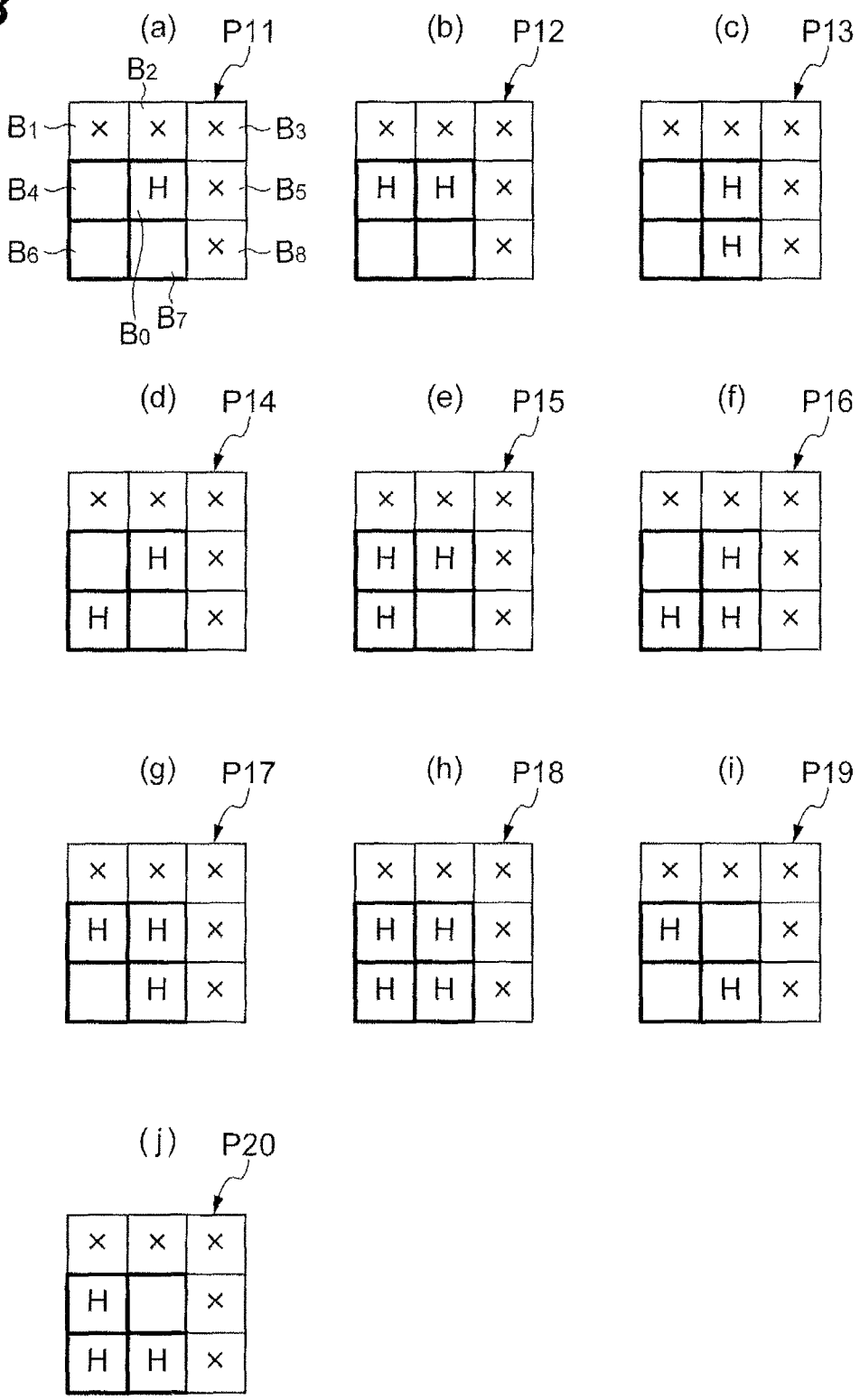
FIG. 8 is a diagram illustrating ten discrimination patterns as a first modified example.

FIG. 8 is a diagram illustrating ten discrimination patterns P11 to P20 as a first modified example. The discrimination patterns P11 to P20 illustrated in FIG. 8 are preferable patterns in the case where the specific electrode portions are $B_4$, $B_6$, $B_7$. These discrimination patterns P11 to P20 are defined in accordance with the same rules as the discrimination pattern P1 to P10 in the above-described embodiment (refer to FIG. 6). First, the carrier input pattern in the case where carriers are received in the pixel electrode portions $B_1$ to $B_3$, $B_5$, $B_8$ other than the specific electrode portions $B_4$, $B_6$, $B_7$ out of the peripheral electrode portions $B_1$ to $B_8$ does not coincide with any one of the discrimination patterns P11 to P20. In other words, these discrimination patterns P11 to P20 do not include a pattern corresponding to the carrier input pattern in the case where the carrier is received in any one of the peripheral electrode portions $B_1$ to $B_3$ included in one of the previous row and the following row (previous row in the present modified example) of the row including the subject electrode portion $B_0$ and peripheral electrode portions $B_3$, $B_5$, $B_8$ included in one of the previous column and the following column (following column in the present modified example) of the column including the subject electrode portion $B_0$. Therefore, in the case where the carrier is received in any one of the peripheral electrode portions $B_1$ to $B_3$, $B_5$, $B_8$, the carrier input pattern discriminating unit 56 of the pixel circuit 5a connected to the subject electrode portion $B_0$ discriminates that the carrier input pattern does not coincide with any one of the plurality of discrimination patterns P11 to P20.

These discrimination patterns P11 to P20 include patterns corresponding to all of the carrier input patterns in the case where: the carrier is received in at least one peripheral electrode out of the peripheral electrode portion $B_4$, $B_7$ included in neither one of the above-mentioned rows (previous row) nor one of the above-mentioned column (following column) and further included in the row or the column including the subject electrode portion $B_0$; and further the carrier is received in the subject electrode portion $B_0$. In other words, the carrier input pattern in the case where the carrier is received in at least one specific electrode portion out of the specific electrode portions $B_4$, $B_7$ included in the row or the column including the subject electrode portion $B_0$ and further the carrier is received in the subject electrode portion $B_0$ surely coincides with any one of the plurality of discrimination patterns P11 to P20. More specifically, all of the patterns in the case where the carriers are received in the peripheral electrode portion $B_4$ and the subject electrode portion $B_0$ are indicated by the discrimination patterns P12, P15, P17, P18. All of the patterns in the case where the carriers are received in the peripheral electrode portion $B_7$ and the subject electrode portion $B_0$ are indicated by the discrimination patterns P13, P16, P17, P18.

These discrimination patterns P11 to P20 include patterns corresponding to the carrier input pattern in the case where: the carrier is received in the peripheral electrode portion $B_4$ not included in one of the above-mentioned column (following column) and further included in the row including the subject electrode portion $B_0$; the carrier is received in the peripheral electrode portion $B_7$ not included in one of the above-mentioned row (previous row) and further included in the column including the subject electrode portion $B_0$; and further the carrier is not received in the subject electrode portion $B_0$. More specifically, all of the patterns in the case where the carriers are received in both of the peripheral electrode portions $B_4$, $B_7$ and further the carrier is not received in the subject electrode portion $B_0$ are indicated by the discrimination patterns P19, P20.

Even in the case where the plurality of discrimination patterns P11 to P20 of the present modified example is applied as the plurality of discrimination patterns used in the carrier input pattern discriminating unit 56, the two-dimensional photon counting element 1A can provide the same effects as the above-described embodiment.

Second Modified Example

Figure 9:
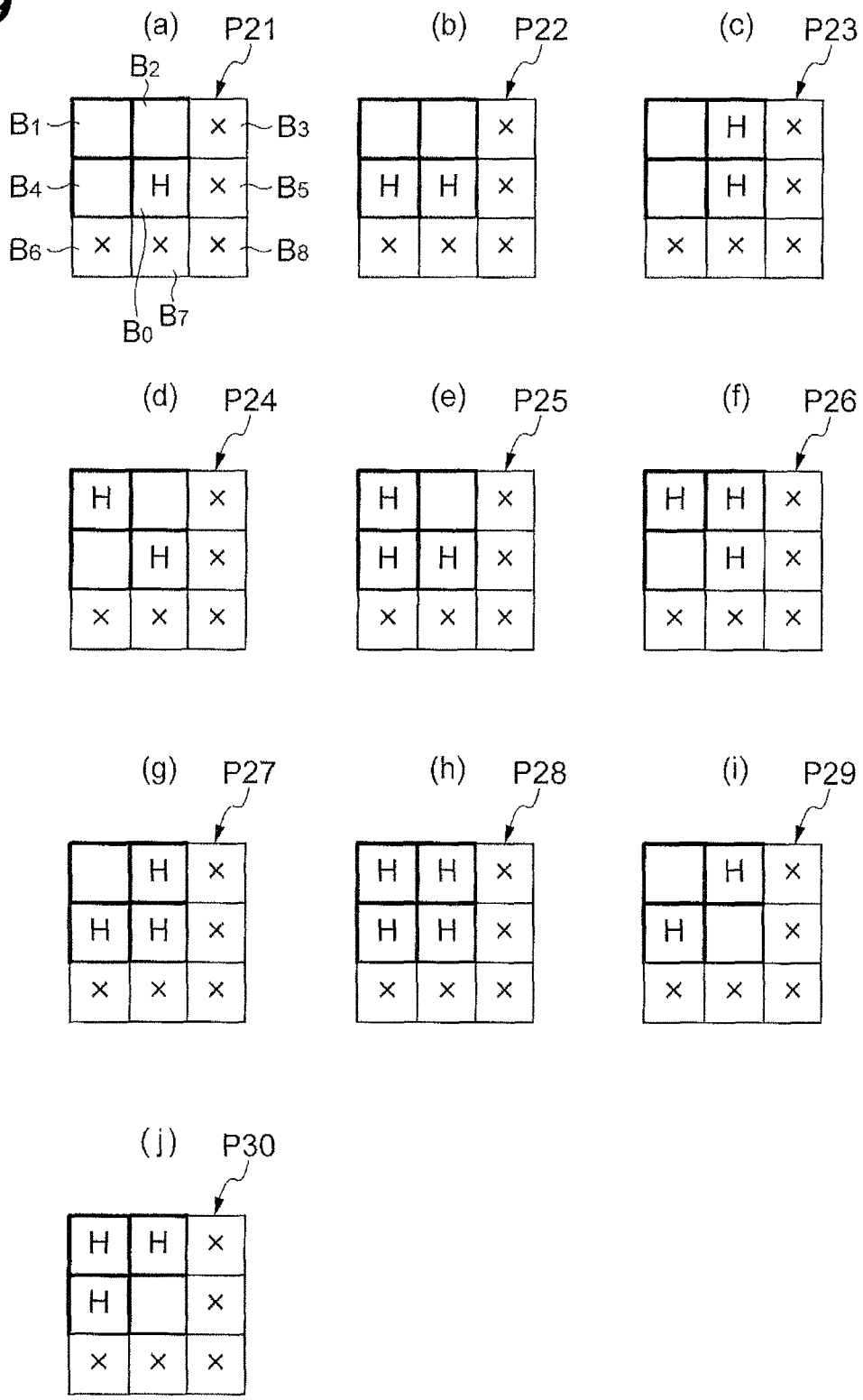
FIG. 9 is a diagram illustrating ten discrimination patterns as a second modified example.

FIG. 9 is a diagram illustrating ten discrimination patterns P21 to P30 as a second modified example. The discrimination patterns P21 to P30 illustrated in FIG. 9 are preferable patterns in the case where the specific electrodes are $B_1$, $B_2$, $B_4$. These discrimination patterns P21 to P30 are also defined in accordance with the same rules as the discrimination pattern P1 to P10 in the above-described embodiment (refer to FIG. 6). First, the carrier input pattern in the case where carriers are received in the pixel electrode portions $B_3$, $B_5$ to $B_8$ other than the specific electrode portions $B_1$, $B_2$, $B_4$ out of the peripheral electrode portions $B_1$ to $B_8$ does not coincide with any one of the discrimination patterns P21 to P30. In other words, these discrimination patterns P21 to P30 do not include a pattern corresponding to the carrier input pattern in the case where the carrier is received in any one of the peripheral electrode portions $B_6$ to $B_8$ included in one of the previous row and the following row (following row in the present modified example) of the row including the subject electrode portion $B_0$ and peripheral electrode portions $B_3$, $B_5$, $B_8$ included in any one of the previous column and the following column (following column in the present modified example) of the column including the subject electrode portion $B_0$. Therefore, in the case where the carrier is received in any one of the peripheral electrode portions $B_3$, $B_5$ to $B_8$, the carrier input pattern discriminating unit 56 of the pixel circuit 5a connected to the subject electrode portion $B_0$ discriminates that the carrier input pattern does not coincide with any one of the plurality of discrimination patterns P21 to P30.

These discrimination patterns P21 to P30 include patterns corresponding to all of the carrier input patterns in the case where: the carrier is received in at least one peripheral electrode portion out of the peripheral electrode portion $B_2$, $B_4$ included in neither one of the above-mentioned rows (following row) nor one of the above-mentioned columns (following column) and further included in the row or the column including the subject electrode portion $B_0$; and further the carrier is received in the subject electrode portion $B_0$. In other words, the carrier input pattern in the case where the carrier is received in at least one specific electrode portion out of the peripheral electrode portions $B_2$, $B_4$ included in the row or the column including the subject electrode portion $B_0$ and further the carrier is received in the subject electrode portion $B_0$ surely coincides with any one of the plurality of discrimination patterns P21 to P30. More specifically, all of the patterns in the case where the carriers are received in the peripheral electrode portion $B_4$ and the subject electrode portion $B_0$ are indicated by the discrimination patterns P22, P25, P27, P28. All of the patterns in the case where the carriers are received in the peripheral electrode portion $B_2$ and the subject electrode portion $B_0$ are indicated by the discrimination patterns P23, P26, P27, P28.

These discrimination patterns P21 to P30 include patterns corresponding to the carrier input pattern in the case where: the carrier is received in the peripheral electrode portion $B_4$ not included in one of the above-mentioned column (following column) and further included in the row including the subject electrode portion $B_0$; the carrier is received in the peripheral electrode portion $B_2$ not included in one of the above-mentioned row (following row) and further included in the column including the subject electrode portion $B_0$; and further the carrier is not received in the subject electrode portion $B_0$. More specifically, all of the patterns in the case where the carriers are received in both of the peripheral electrode portions $B_2$, $B_4$ and further the carrier is not received in the subject electrode portion $B_0$ are indicated by the discrimination patterns P29, P30.

Even in the case where the plurality of discrimination patterns P21 to P30 of the present modified example is applied as the plurality of discrimination patterns used in the carrier input pattern discriminating unit 56, the two-dimensional photon counting element 1A can provide the same effects as the above-described embodiment.

Third Modified Example

Figure 10:
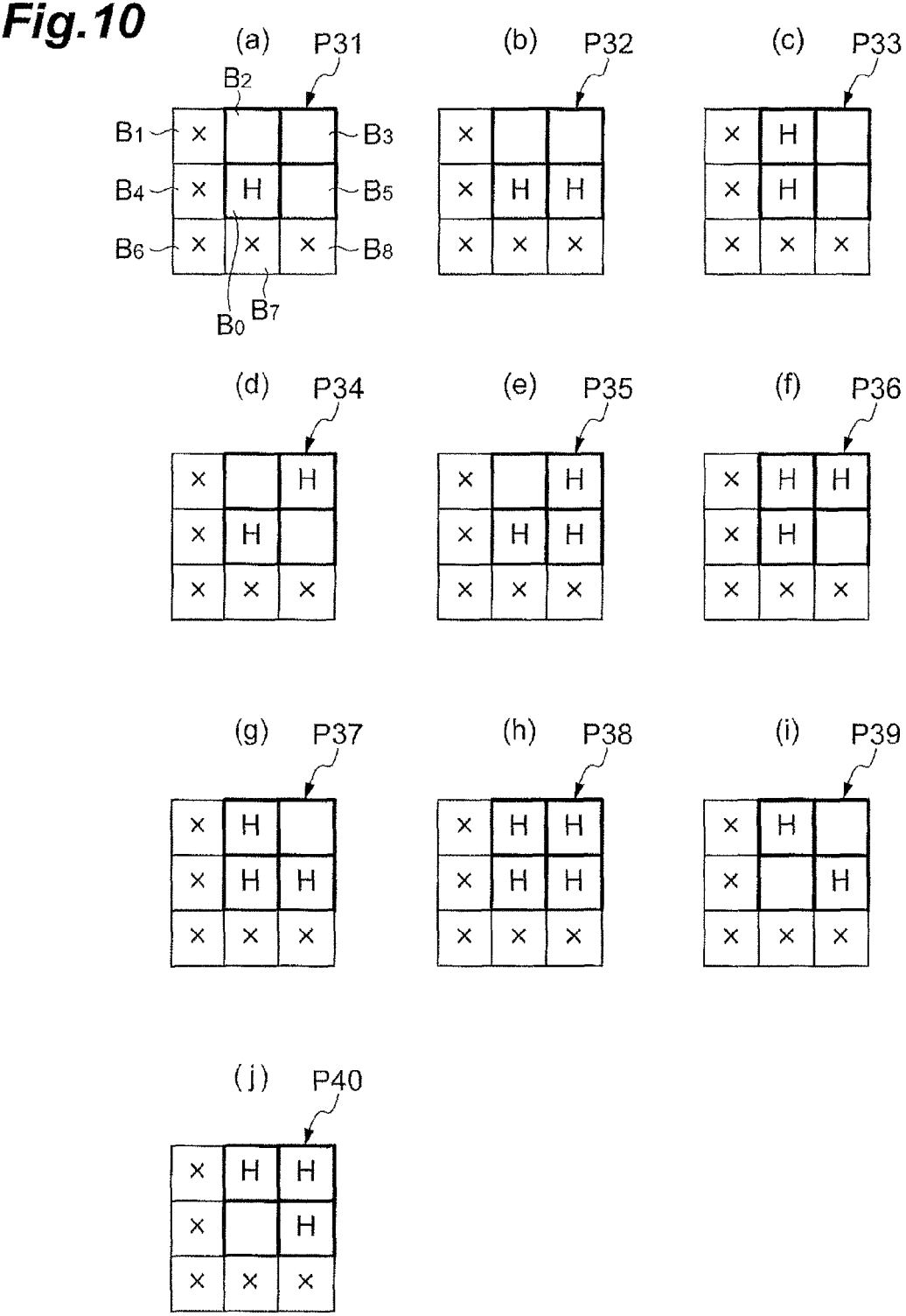
FIG. 10 is a diagram illustrating ten discrimination patterns as a third modified example.

FIG. 10 is a diagram illustrating ten discrimination patterns P31 to P40 as a third modified example. The discrimination patterns P31 to P40 illustrated in FIG. 10 are preferable patterns in the case where the specific electrode portions are $B_2$, $B_3$, $B_5$. These discrimination patterns P31 to P40 are also defined in accordance with the same rules as the discrimination pattern P1 to P10 in the above-described embodiment (refer to FIG. 6). First, the carrier input pattern in the case where carriers are received in the pixel electrode portions $B_1$, $B_4$, $B_6$ to $B_8$ other than the specific electrode portions $B_2$, $B_3$, $B_5$ out of the peripheral electrode portions $B_1$ to $B_8$ does not coincide with any one of the discrimination patterns P31 to P40. In other words, these discrimination patterns P31 to P40 do not include a pattern corresponding to the carrier input pattern in the case where the carrier is received in any one of the peripheral electrode portions $B_6$ to $B_8$ included in one of the previous row and the following row (following row in the present modified example) of the row including the subject electrode portion $B_0$ and peripheral electrode portions $B_1$, $B_4$, $B_6$ included in one of the previous column and the following column (previous column in the present modified example) of the column including the subject electrode portion $B_0$. Therefore, in the case where the carrier is received in one of the peripheral electrode portions $B_1$, $B_4$, $B_6$ to $B_8$, the carrier input pattern discriminating unit 56 of the pixel circuit 5a connected to the subject electrode portion $B_0$ discriminates that the carrier input pattern does not coincide with any one of the plurality of discrimination patterns P31 to P40.

These discrimination patterns P31 to P40 include patterns corresponding to all of the carrier input patterns in the case where: the carrier is received in at least one peripheral electrode portion out of the peripheral electrode portion $B_2$, $B_5$ included in neither one of the above-mentioned row (following row) nor one of the above-mentioned column (previous column) and further included in the row or the column including the subject electrode portion $B_0$; and further the carrier is received in the subject electrode portion $B_0$. In other words, the carrier input pattern in the case where the carrier is received in at least one specific electrode portion out of the specific electrode portions $B_2$, $B_5$ included in the row or the column including the subject electrode portion $B_0$ and further the carrier is received in the subject electrode portion $B_0$ surely coincides with any one of the plurality of discrimination patterns P31 to P40. More specifically, all of the patterns in the case where the carriers are received in the peripheral electrode portion $B_5$ and the subject electrode portion $B_0$ are indicated by the discrimination patterns P32, P35, P37, P38. All of the patterns in the case where the carriers are received in the peripheral electrode portion $B_2$ and the subject electrode portion $B_0$ are indicated by the discrimination patterns P33, P36, P37, P38.

These discrimination patterns P31 to P40 include patterns corresponding to the carrier input pattern in the case where: the carrier is received in the peripheral electrode portion $B_5$ not included in one of the above-mentioned column (previous column) and further included in the row including the subject electrode portion $B_0$; the carrier is received in the peripheral electrode portion $B_2$ not included in one of the above-mentioned row (following row) and further included in the column including the subject electrode portion $B_0$; and further the carrier is not received in the subject electrode portion $B_0$. More specifically, all of the patterns in the case where the carriers are received in both of the peripheral electrode portions $B_2$, $B_5$ and further the carrier is not received in the subject electrode portion $B_0$ are indicated by the discrimination patterns P39, P40.

Even in the case where the plurality of discrimination patterns P31 to P40 of the present modified example is applied as the plurality of discrimination patterns used in the carrier input pattern discriminating unit 56, the two-dimensional photon counting element 1A can provide the same effects as the above-described embodiment.

Fourth Modified Example

Figure 11:
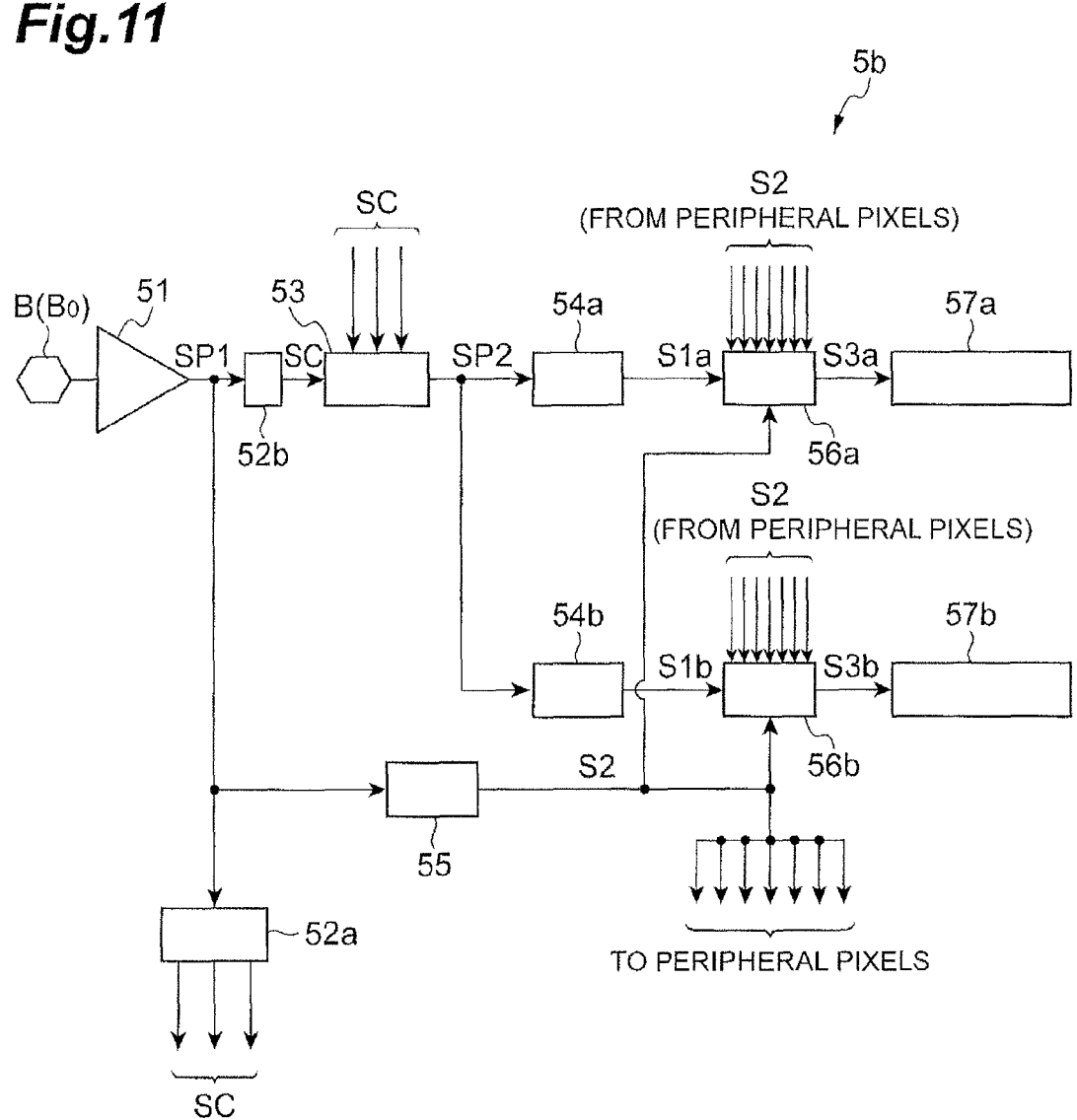
FIG. 11 is a diagram illustrating an example of internal configuration of a pixel circuit according to a fourth modified example.

Next, a modified example of a pixel circuit 5b will be described as a fourth modified example with reference to FIG. 11. FIG. 11 is a diagram illustrating an example of internal configuration of the pixel circuit 5b according to the fourth modified example. As illustrated in FIG. 11, the pixel circuit 5b includes the signal generating unit 51, the current outputting units 52a, 52b, the adding unit 53, comparing units 54a, 54b, the carrier input signal generating unit 55, carrier input pattern discriminating units 56a, 56b, and counting units 57a, 57b. The signal generating unit 51, current outputting units 52a, 52b, adding unit 53, and carrier input signal generating unit 55 have the configurations and operation same as the above-described embodiment. Therefore, a detailed description for the configurations and the operation will be omitted therefor.

The comparing units 54a, 54b are connected to the output end of the adding unit 53 and receive voltage signal SP2 from the adding unit 53. The comparing unit 54a determines whether a peak voltage value of the voltage signal SP2 exceeds a predetermined first threshold. In the case where the peak voltage value of the voltage signal SP2 exceeds the first threshold, the comparing unit 54a outputs a High level (significant value) as a determination result signal S1a. The comparing unit 54b determines whether the peak voltage value of the voltage signal SP2 exceeds a second threshold larger than the first threshold. In the case where the peak voltage value of the voltage signal. SP2 exceeds the second threshold, the comparing unit 54b outputs the High level (significant value) as a determination result signal S1b. The comparing units 54a, 54b output a Low level (non-significant value) as the determination result signals S1a, S1b in the other cases besides the above-described cases.

The carrier input pattern discriminating units 56a, 56b receive the carrier input signals S2 from the seven pixel circuits 5b respectively connected to the peripheral electrode portions $B_1$ to $B_7$. The carrier input pattern discriminating units 56a, 56b determine whether a carrier input pattern coincides with any one of the plurality of discrimination patterns based on these carrier input signals S2. The carrier input pattern indicates, per electrode, presence of a carrier receipt in the subject electrode portion $B_0$ and the peripheral electrode portions $B_1$ to $B_7$. In the case where the carrier input pattern coincides with any one of the plurality of discrimination patterns and further the High level (significant value) is received as the determination result signal S1a, the carrier input pattern discriminating unit 56a outputs the High level (significant value) as a discrimination signal S3a. In other cases, the carrier input pattern discriminating unit 56a outputs the Low level (non-significant value) as the discrimination signal S3a. In the same manner, in the case where the carrier input pattern coincides with any one of the plurality of discrimination patterns and further the High level (significant value) is received as the determination result signal S1b, the carrier input pattern discriminating unit 56b outputs the High level (significant value) as a discrimination signal S3b. In other cases, the carrier input pattern discriminating unit 56a outputs the Low level (non-significant value) as the discrimination signal S3b.

The counting units 57a, 57b respectively function as first and second counting units in the present embodiment. In the counting unit 57a, the number of photons is incremented in the case where the carrier input pattern discriminating unit 56a discriminates that the carrier input pattern coincides with any one of the plurality of discrimination patterns and further the High level (significant value) is output as the determination result signal S1a (namely, in the case where the discrimination signal S1a is the High level (significant value)). In the same manner, in the counting unit 57b, the number of photons is incremented in the case where the carrier input pattern discriminating unit 56b discriminates that the carrier input pattern coincides with any one of the plurality of discrimination patterns and further the High level (significant value) is output as the determination result signal S1b (namely, in the case where the discrimination signal S3b is the High level (significant value).

Like the pixel circuit 5b of the present modified example, the pixel circuit may include a plurality of comparing units. Even in this case, the effects same as the above-described embodiment can be obtained. Further, effects described below can be further obtained by providing the plurality of comparing units like the present modified example.

Figure 12:
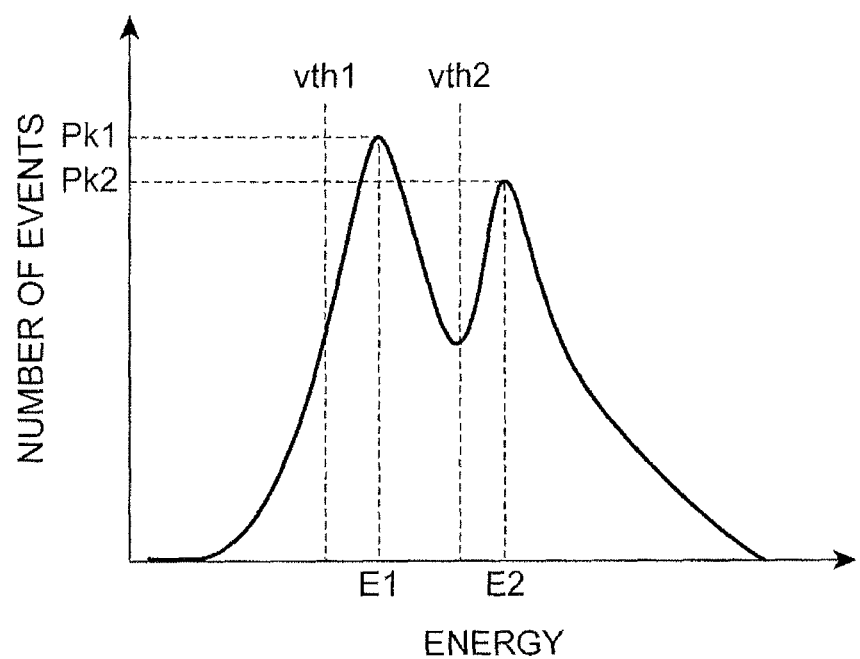
FIG. 12 is a graph to describe effects brought by the fourth modified example, and also is the graph illustrating an example of relation between energy of X-ray incident to the converting unit and the number of events (count number).

FIG. 12 is a graph to describe an effect brought by the present modified example, and also is the graph illustrating an example of relation between energy of X-ray incident to the converting unit 3 and the number of events (count number). In this example, the count number reaches a peak Pk1 at certain energy E1 and the counter number reaches a different peak Pk2 at different energy E2 larger than the energy E1. Here, it is assumed that the energy E1 corresponding to the peak Pk1 is an effective energy value to improve image quality (for example, an X-ray energy band that improves contrast). In this case, when a predetermined threshold is one value (threshold value vth1 in the drawing) smaller than the energy E1, all of photons having energy values of vth1 or more are counted. In contrast, by setting the first threshold value vth1 and a second threshold vth2 larger than the energy E1 and acquiring a difference between a count value in the threshold vth1 and a count value in the threshold vth2, accurate data (data in desired energy band) can be obtained by a single measurement.

In the case where photon energy is known such as a line y, the photon energy can be also used as a countermeasure against pile-up. More specifically, in the case where it is preliminarily known that energy of an incident photon is surely included in a range between the threshold vth1 or more and the threshold vth2 or less, estimation is made that there is continuous incidence of two photons in the case of having the energy exceeding the threshold vth2. By this, the number of photons is counted as two in the present modified example. According to the system of the above-described embodiment (refer to FIG. 3), the number of photons may be counted as one in the case where there is continuous incidence of two photons. However, according to the present modified example, such counting loss can be further reduced as described above.

The two-dimensional photon counting element according to the present invention is not limited to the above-described embodiment, and other various kinds of modifications can be made. For example, according to the above-described embodiment and the respective modified examples, eight pixel electrode portions $B_1$ to $B_8$ included in the previous row, the following row, the previous column, and the following column are set as the peripheral electrode portions, and the discrimination patterns are set in the area of 3×3 pixels including the subject electrode portion $B_0$. According to the present invention, there is no restriction in a size of the area to be a target of the discrimination patterns, and the discrimination patterns can be optionally set in the areas of various sizes such as 4×4 pixels or 5×5 pixels. According to the above-described embodiment and the respective modified examples, the area of 2×2 pixels (including the subject electrode portion) is exemplified as the specific electrode portions, but the specific electrode portion can also be optionally set from among the peripheral electrode portions.

According to the present embodiment and the present modified examples, the comparing units 54, 54a, 54b are located in a previous stage of the carrier input pattern discriminating units 56, 56a, 56b, but the positions of the comparing units 54, 54a, 54b are not limited thereto. For example, the comparing units 54, 54a, 54b may also be located in a subsequent stage of the carrier input pattern discriminating units 56, 56a, 56b. In this case, the carrier input pattern discriminating unit 56, 56a, 56b are connected to the output ends of the adding unit 53 and receive the voltage signals SP2 from the adding unit 53. In the case where the carrier input pattern coincides with any one of the plurality of discrimination patterns and further the voltage signal SP2 is received from the adding unit 53, the carrier input pattern discriminating unit 56, 56a, 56b output the voltage signals SP2 to the comparing units 54, 54a, 54b. The comparing units 54, 54a, 54b determine whether a peak voltage value of the voltage signal SP2 received from the adding unit 53 via the carrier input pattern discriminating units 56, 56a, 56b exceeds a predetermined threshold. In the counting units 57, 57a, 57b, the number of photons is incremented in the case where the determination result signal S1 output from the comparing unit 54, 54a, 54b is the High level (significant value).

INDUSTRIAL APPLICABILITY

The present invention is applicable to a two-dimensional photon counting element.

REFERENCE SIGNS LIST

1 A two-dimensional photon counting element; 3 converting unit; 5 counting circuit; 5a pixel circuit; 51 signal generating unit; 52a, 52b current outputting unit; 53 adding unit; 54 comparing unit; 55 carrier input signal generating unit; 56 carrier input pattern discriminating unit; 57 counting unit; B pixel electrode portion; B0 subject electrode portion; B1 to B8 peripheral electrode portion; P photon; P1 to P40 discrimination pattern; S1 determination result signal; S2 carrier input signal; SP1 input signal; SP2 voltage signal.

The invention claimed is:

1. A two-dimensional photon counting element, comprising:
   a counting circuit connected to a plurality of pixel electrode portions arrayed two-dimensionally in M rows and N columns (M and N are integers of two or more) and counting number of photons by detecting carriers collected via the plurality of pixel electrode portions from a conversion unit that converts a photon to a carrier, wherein the counting circuit includes:
a signal generating unit that generates an input signal having a value corresponding to number of carriers received in a certain pixel electrode portion out of the plurality of pixel electrode portions;
an adding unit that adds the input signal generated in the signal generating unit connected to a specific pixel electrode portion out of the pixel electrode portions arranged around the certain pixel electrode portion to the input signal generated in the signal generating unit connected to the certain pixel electrode portion;
a carrier input signal generating unit connected to the signal generating unit and generating a carrier input signal based on the input signal from the signal generating unit;
a carrier input pattern discriminating unit that discriminates whether a carrier input pattern coincides with any one of a plurality of predetermined discrimination patterns, the carrier input pattern indicating, per pixel electrode portion, presence of any carrier received in the certain pixel electrode portion and the pixel electrode portions arranged around the certain pixel electrode portion, the carrier input pattern being defined based on the carrier input signal from the carrier input signal generating unit corresponding to the certain pixel electrode portion and the carrier input signals from the carrier input signal generating units corresponding to the pixel electrode portions arranged around the certain pixel electrode portion; and
a counting unit that increments the number of photons in a case where the carrier input pattern discriminating unit discriminates that the carrier input pattern coincides with any one of the plurality of predetermined discrimination patterns and further the input signal output from the adding unit after addition has a value exceeding a predetermined threshold.

2. The two-dimensional photon counting element according to claim 1,
wherein the carrier input pattern in a case where a carrier is received in the pixel electrode portion other than the specific pixel electrode portion out of the pixel electrode portions arranged around the certain pixel electrode portion does not coincide with any one of the plurality of predetermined discrimination patterns.

3. The two-dimensional photon counting element according to claim 1,
wherein the plurality of predetermined discrimination patterns includes a pattern corresponding to a carrier input pattern in a case where the carrier is not received in the certain pixel electrode portion.

4. The two-dimensional photon counting element according to claim 1,
wherein a carrier input pattern in a case where the carrier is received in at least one specific pixel electrode portion out of the specific pixel electrode portion included in a row or a column including the certain pixel electrode portion and further a carrier is received in the certain pixel electrode portion coincides with any one of the plurality of predetermined discrimination patterns.

5. The two-dimensional photon counting element according to claim 1,
wherein the counting circuit includes, as the counting unit:
a first counting unit that increments the number of photons in a case where the carrier input pattern is discriminated to coincide with any one of the plurality of predetermined discrimination patterns and further the input signal output from the adding unit after addition has a value exceeding a first threshold; and
a second counting unit that increments the number of photons in a case where the carrier input pattern is discriminated to coincide with any one of the plurality of predetermined discrimination patterns and further the input signal output from the adding unit after addition has a value exceeding a second threshold larger than the first threshold.

* * * * *